(12) United States Patent
Liu et al.

(10) Patent No.: US 9,928,808 B2
(45) Date of Patent: Mar. 27, 2018

(54) INFORMATION INTERACTION METHOD AND ELECTRONIC DEVICE

(71) Applicants: Beijing Lenovo Software Ltd., Beijing (CN); Lenovo (Beijing) Co., Ltd., Beijing (CN)

(72) Inventors: Qing Liu, Beijing (CN); Xiang Shao, Beijing (CN); Qi Li, Beijing (CN); Jinping Yang, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 174 days.

(21) Appl. No.: 14/482,488

(22) Filed: Sep. 10, 2014

(65) Prior Publication Data
US 2015/0116238 A1    Apr. 30, 2015

(30) Foreign Application Priority Data

Oct. 24, 2013 (CN) .......................... 2013 1 0507418

(51) Int. Cl.
*G09G 5/12* (2006.01)
*G06F 3/14* (2006.01)
*G06F 3/038* (2013.01)

(52) U.S. Cl.
CPC .............. *G09G 5/12* (2013.01); *G06F 3/038* (2013.01); *G06F 3/1423* (2013.01);
(Continued)

(58) Field of Classification Search
USPC ................................................ 345/173, 1.3
See application file for complete search history.

(56) References Cited

U.S. PATENT DOCUMENTS 8,064,831 B2 * 11/2011 Ohkita ................ H04M 1/7253
455/41.1
8,472,874 B2    6/2013 Tang et al.
(Continued)

FOREIGN PATENT DOCUMENTS

CN    101632270 A    1/2010
CN    101989166 A    3/2011
(Continued)

OTHER PUBLICATIONS

First Chinese Office Action regarding Application No. 201310507418.7 dated Mar. 30, 2017. English translation provided by www.http://globaldossier.uspto.gov.
(Continued)

*Primary Examiner* — Jennifer Mehmood
*Assistant Examiner* — Deeprose Subedi
(74) *Attorney, Agent, or Firm* — Harness, Dickey & Pierce, P.L.C.

(57) ABSTRACT

An information interaction method and an electronic device are provided. The method is applicable in a first electronic device. The first electronic device includes a first interaction unit and a second interaction unit, where the first interaction unit includes a first display unit. The method includes receiving device information of a second electronic device via the second interaction unit when the second interaction unit is in a working state; processing the device information of the second electronic device; and sending a procedure of the processing to the first interaction unit via the second interaction unit for displaying via the first display unit. When the second interaction unit is in a working state, the second interaction unit receives device information of the second electronic device, and the connection with the second electronic device may be achieved without inputting
(Continued)

information manually, therefore the connection process is simple.

18 Claims, 8 Drawing Sheets

(52) U.S. Cl.
CPC ....... *G06F 3/1454* (2013.01); *G09G 2354/00* (2013.01); *G09G 2356/00* (2013.01); *G09G 2370/16* (2013.01); *G09G 2370/22* (2013.01)

(56) References Cited

U.S. PATENT DOCUMENTS

| | | |
|---|---|---|
| 2006/0146765 A1 | 7/2006 | Van De Sluis et al. |
| 2008/0227393 A1 | 9/2008 | Tang et al. |
| 2010/0069004 A1 | 3/2010 | Bloebaum |
| 2010/0082834 A1* | 4/2010 | Joung ................ H04N 21/2383 709/231 |
| 2012/0040719 A1* | 2/2012 | Lee ....................... G06F 1/1626 455/557 |
| 2012/0054355 A1 | 3/2012 | Arrasvuori et al. |
| 2013/0203353 A1* | 8/2013 | Kim ......................... H04B 7/24 455/41.2 |
| 2013/0232437 A1* | 9/2013 | Kim ....................... G06F 3/0231 715/773 |
| 2015/0007066 A1* | 1/2015 | Joo ........................ G06F 3/0481 715/761 |
| 2017/0064055 A1* | 3/2017 | Kim ......................... H04B 7/24 |

FOREIGN PATENT DOCUMENTS

| | | | |
|---|---|---|---|
| CN | 102799373 A | | 11/2012 |
| CN | 103176765 A | * | 6/2013 |
| CN | 104571653 A | | 4/2015 |

OTHER PUBLICATIONS

Second Chinese Office Action regarding Application No. 201310507418.7 dated Dec. 18, 2017. English translation provided by http://globaldossier.uspto.gov.

* cited by examiner

INFORMATION INTERACTION METHOD AND ELECTRONIC DEVICE

CROSS REFERENCES OF RELATED APPLICATIONS

The present application claims the priority to Chinese Patent Application No. 201310507418.7, entitled "INFORMATION INTERACTION METHOD AND ELECTRONIC DEVICE", filed on Oct. 24, 2013 with the State Intellectual Property Office of People's Republic of China, which is incorporated herein by reference in its entirety.

FIELD

The disclosure relates to the technical field of information interaction, and in particular to an information interaction method and an electronic device thereof.

BACKGROUND

Touch screen is a device integrating a display unit and an input unit, which may be arranged in terminals such as cell phones and laptops. Furthermore, a dual-touch screen laptop takes full advantage of the characteristics of the touch screen for being capable of displaying and inputting.

Dual-touch screen laptop has no keyboard, and in a keyboard area a touch screen of a same size as an upper screen is provided instead. A user may use the touch screen in the keyboard area to perform operations related to keyboard input, and the upper screen may respond accordingly. If a user intends to connect a dual-touch screen laptop with other devices such as cell phone, he still needs to perform the conventional tedious operations of connecting the devices via blue teeth or WIFI, selecting an AP manually and then inputting a user name and a password. It is also tedious to connect the devices via a third-party tool such as a cable.

SUMMARY

In view of this, to avoid the tedious operations for connecting a dual-touch screen laptop with another device, technical solutions as follows are provided.

An information interaction method, applicable in a first electronic device, where the first electronic device includes a first interaction unit and a second interaction unit, the first interaction unit includes a first display unit, the method includes:

receiving device information of a second electronic device via the second interaction unit when the second interaction unit is in a working state; and processing the device information of the second electronic device, sending a procedure of the processing to the first interaction unit via the second interaction unit for displaying via the first display unit.

Preferably, the device information of the second electronic device includes information of a position where the second electronic device is disposed on the second interaction unit, the process of processing the device information of the second electronic device includes:

obtaining, based on the information of the position, the position where the second electronic device is disposed on the second interaction unit; and establishing a connection with the second electronic device once the second electronic device is disposed at a predetermined position on the second interaction unit.

Preferably, in the method, the process of establishing a connection with the second electronic device includes:

establishing a wireless connection with the second electronic device to form a wireless channel; and receiving, via the wireless channel, data information transmitted by the second electronic device.

Preferably, the method further includes:

once location information of a touch point on the second electronic device is detected by the second interaction unit, identifying the second electronic device based on the location information, where the touch point is arranged on the second electronic device and has unique location information.

Preferably, the method further includes displaying, by the second interaction unit, a user interface (UI) corresponding to the location information.

An electronic device is further provided according to an embodiment of the invention, where the device is a first electronic device including a first interaction unit and a second interaction unit, the first interaction unit includes a first display unit, the first electronic device further includes:

a receiving unit, configured to receive device information of a second electronic device via the second interaction unit when the second interaction unit is in a working state; and a processing unit, configured to process the device information of the second electronic device and send a procedure of the processing to the first interaction unit via the second interaction unit for displaying via the first display unit.

Preferably, the device information of the second electronic device includes information of a position where the second electronic device is disposed on the second interaction unit, the processing unit includes:

a position determining module, configured to obtain, based on the information of the position, the position where the second electronic device is disposed on the second interaction unit; and a connecting module, configured to establish a connection with the second electronic device once the second electronic device is disposed at a predetermined position on the second interaction unit.

Preferably, the connecting module includes:

a wireless connection sub-module, configured to establish a wireless connection with the second electronic device to form a wireless channel; and a transmitting sub-module, configured to receive, via the wireless channel, data information transmitted by the second electronic device.

Preferably, the first electronic device further includes:

an identifying unit, configured to, once location information of a touch point on the second electronic device is detected by the second interaction unit, identify the second electronic device based on the location information, where the touch point is arranged on the second electronic device and has unique location information.

Preferably, the first electronic device further includes:

a second display unit, configured to be used by the second interaction unit to display a UI corresponding to the location information.

BRIEF DESCRIPTION OF THE DRAWINGS

To make the solutions and embodiments provided in the disclosure better understood by those skilled in the art, the drawings used in describing the embodiments and the conventional technology will be briefly described in the following. Obviously, the drawings described in the following illustrate only a few of the embodiments of the invention, and those skilled in the art may obtain other drawings according to these drawings without creatively work.

DETAILED DESCRIPTION

The technical solutions according to the embodiments of the invention will be described with details in conjunction with the drawings. Obviously, the disclosed embodiments are a few of the embodiments of the invention, rather than all of the embodiments. Other embodiments obtained by those skilled in the art based on the embodiments of the invention without creative work, fall into the scope of the invention.

Figure 1:
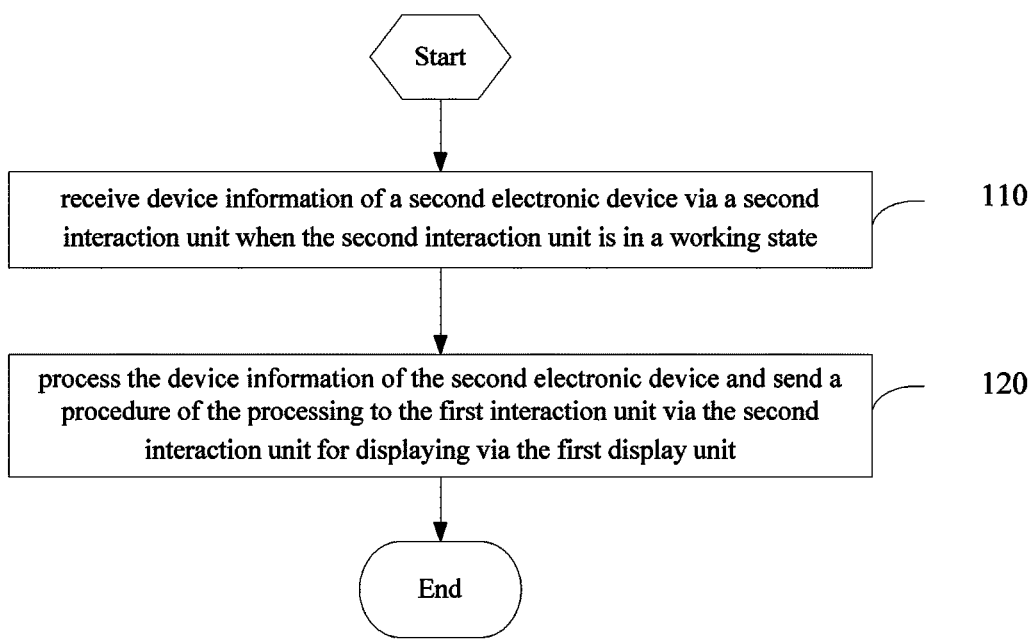
FIG. 1 is a flowchart showing an information interaction method provided according to an embodiment of the invention.

FIG. 1 is a flowchart showing an information interaction method provided according to an embodiment of the invention. The method is applicable in a first electronic device, and includes the steps Step 110 and Step 120.

Step 110 is to receive device information of a second electronic device via a second interaction unit when the second interaction unit is in a working state.

The first interaction unit and the second interaction unit may each be a touch screen. The first electronic device may be a laptop with a first touch screen and a second touch screen, where the second touch screen is arranged horizontally; the first and the second touch screens are connected; the first and the second touch screens may be folded together and unfolded apart; the first touch screen carries a first display unit, where the first touch screen is configured to display output of the laptop; the second touch screen may display input icons such as keys as in a keyboard. The second electronic device may be a cell phone, a PAD or other mobile devices. Device information of the cell phone may be received via the second touch screen when the second touch screen is in a working state.

Step 120 is to process the device information of the second electronic device and send a procedure of the processing to the first interaction unit via the second interaction unit for displaying via the first display unit.

The received device information of the cell phone may be processed, and the procedure of the processing is displayed on the first display unit of the first touch screen. By the technical solution provided in the disclosure, when the second interaction unit is in a working state, the second interaction unit receives device information of the second electronic device, the connection with the second electronic device may be achieved without inputting information manually, therefore the connection process is simple.

Figure 2:
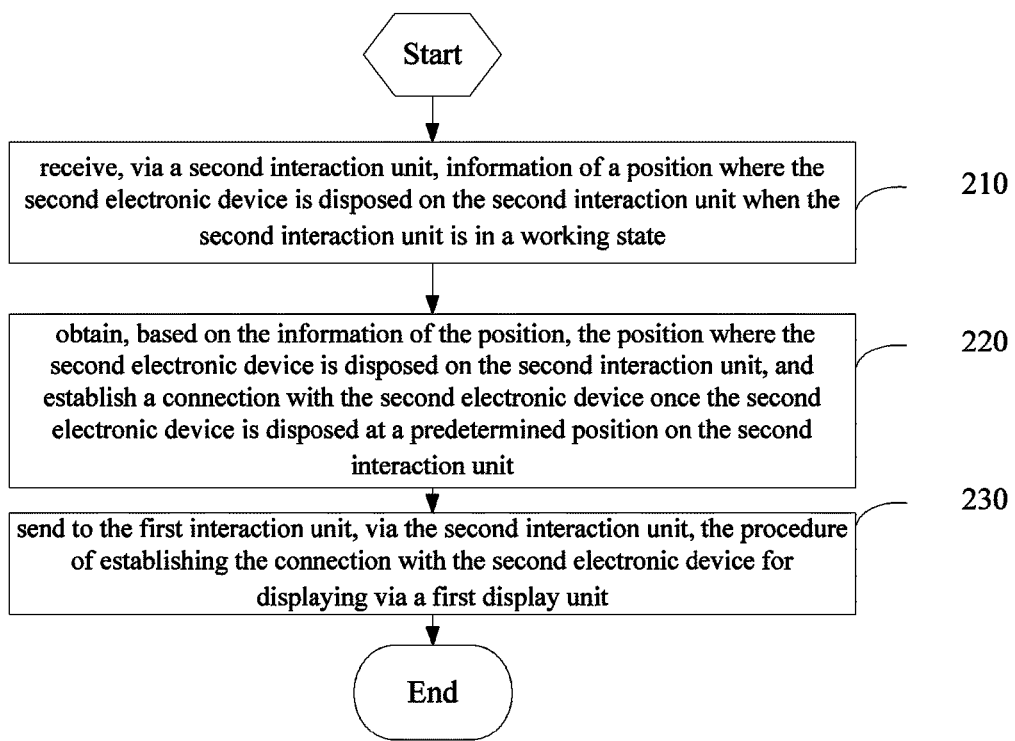
FIG. 2 is another flowchart showing an information interaction method provided according to an embodiment of the invention.

FIG. 2 is a flowchart showing an information interaction method provided according to an embodiment of the invention. The method is applicable in a first electronic device, and includes the steps from Step 210 to Step 230.

Step 210 is to receive, via a second interaction unit, information of a position where the second electronic device is disposed on the second interaction unit when the second interaction unit is in a working state.

A first interaction unit and the second interaction unit may each be a touch screen. The first electronic device may be a laptop with a first touch screen and a second touch screen, where the second touch screen is arranged horizontally; the first and the second touch screens are connected; the first and the second touch screens may be folded together and unfolded apart; the first touch screen carries a first display unit, where the first touch screen is configured to display output of the laptop; the second touch screen may display input icons such as keys as in a the keyboard. Preferably, the second electronic device may be a cell phone or a PAD or a mobile device which is smaller than the second touch screen, thus the cell phone may neither block input operation toward the second touch screen nor block display of output on the second touch screen when the cell phone is disposed on the second touch screen of the laptop. The information of the position where the cell phone is disposed on the second touch screen may be received via the second touch screen when the second touch screen is in a working state.

Step 220 is to obtain, based on the information of the position, the position where the second electronic device is disposed on the second interaction unit, and establish a connection with the second electronic device once the second electronic device is disposed at a predetermined position on the second interaction unit.

Figure 3:
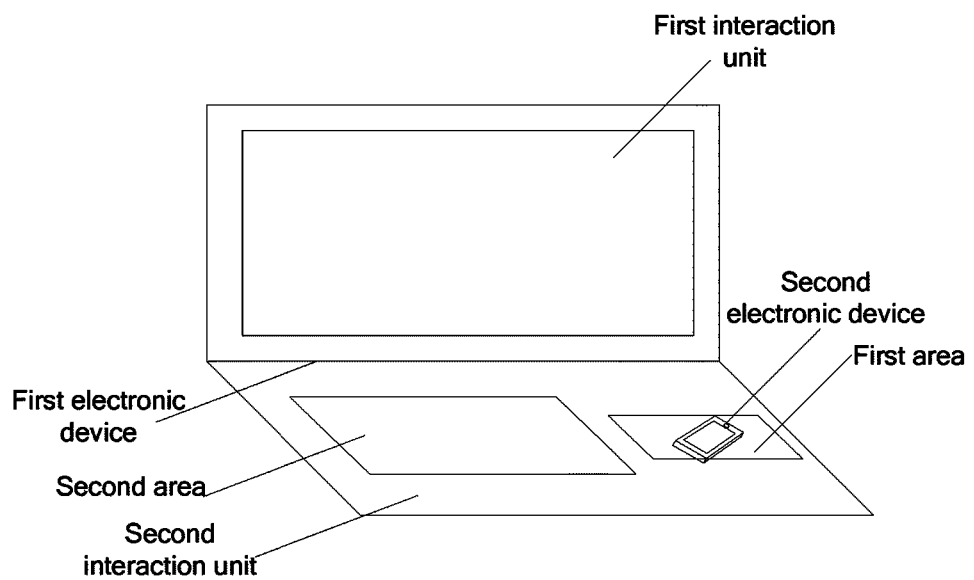
FIG. 3 is a schematic diagram of an application scenario for an information interaction method provided according to an embodiment of the invention.

The position where the cell phone is disposed on the second touch screen is obtained based on the information of the position. Once the cell phone is disposed at the predetermined position on the second touch screen, for example, once it is detected that the cell phone is in a first area of the second touch screen as shown in FIG. 3, a connection with the cell phone may be established. Furthermore, a touch point may be arranged on the second electronic device, and the position where the second electronic device is disposed on the second interaction unit may be obtained via the detected touch point on the second electronic device.

Step 230 is to send to the first interaction unit, via the second interaction unit, the procedure of establishing the connection with the second electronic device for displaying via a first display unit.

Furthermore, in other embodiments of the invention, when the second interaction unit is in a working state, a movement trail for disposing the second electronic device on the second interaction unit may be received via the second interaction unit. The position where the second electronic device is disposed on the second interaction device may be obtained based on the movement trail of the second electronic device.

By the technical solution provided in the disclosure, the second electronic device may be disposed on the second interaction unit of the first electronic device, and the information of the position of the second electronic device is received when the second interaction unit is in a working state, and then the position where the second electronic device is disposed on the second interaction unit may be obtained based on the information of the position. Once the second electronic device is disposed at a predetermined position on the second interaction unit, a connection with the second electronic device is established. Therefore, the connection with the second electronic device may be achieved without inputting information manually, and the connection process is simple.

Figure 4:
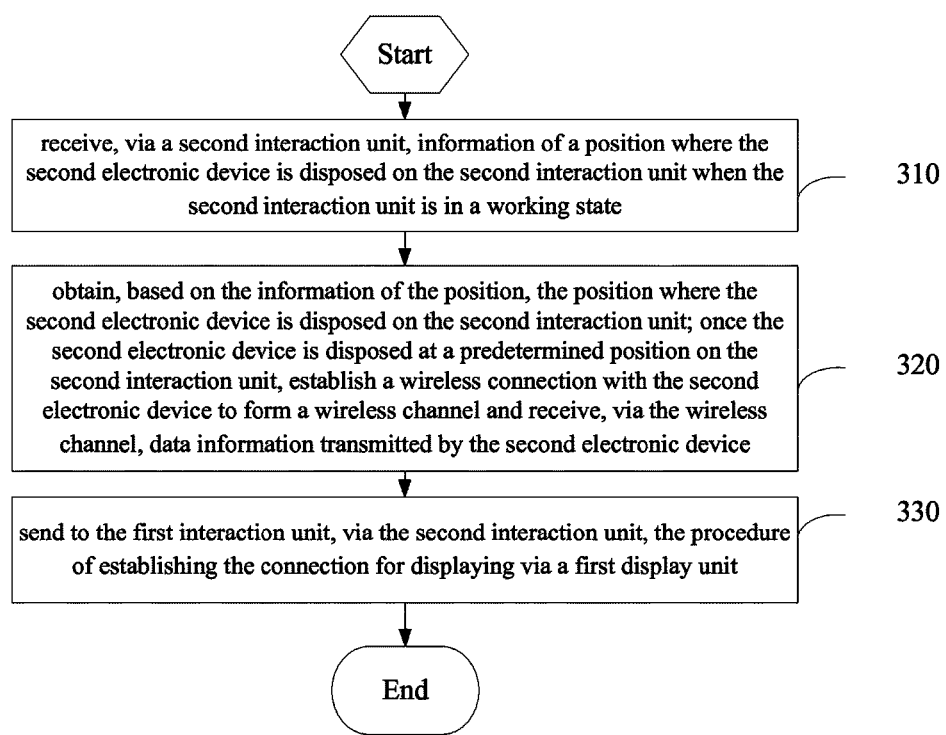
FIG. 4 is another flowchart showing an information interaction method provided according to an embodiment of the invention.

FIG. 4 is a flowchart showing an information interaction method provided according to an embodiment of the invention. The method is applicable in a first electronic device, and includes the steps from Step 310 to Step 330.

Step 310 is to receive, via a second interaction unit, information of a position where the second electronic device is disposed on the second interaction unit when the second interaction unit is in a working state.

A first interaction unit and the second interaction unit may each be a touch screen. The first electronic device may be a laptop with a first touch screen and a second touch screen, where the second touch screen is arranged horizontally; the first and the second touch screens are connected; the first and the second touch screens may be folded together and unfolded apart; the first touch screen carries a first display unit, where the first touch screen is configured for displaying output of the laptop; the second touch screen may display input icons such as keys as in a keyboard. Preferably, the second electronic device may be a cell phone or a PAD or a mobile device which is smaller than the second touch screen, thus the cell phone may neither block input operation toward the second touch screen nor block display of output on the second touch screen when the cell phone is disposed on the second touch screen of the laptop. The information of the position where the cell phone is disposed on the second touch screen may be received via the second touch screen when the second touch screen is in a working state.

Step 320 is to obtain, based on the information of the position, the position where the second electronic device is disposed on the second interaction unit; once the second electronic device is disposed at a predetermined position on the second interaction unit, establish a wireless connection with the second electronic device to form a wireless channel and receive, via the wireless channel, data information transmitted by the second electronic device.

Once a cell phone is disposed at the predetermined position on the second touch screen, a wireless connection with the second electronic device may be established. Furthermore, a web site service whereby to receive data and store the data according to a corresponding path may be established. The second electronic device accesses to a page of the web site via a wireless local area network, and calls an uploading function of the web site and then transmits files of the second electronic device to the first electronic device. Alternatively, a WIFI or a blue teeth connection with the second electronic device may be established and the files of the second electronic device may be transmitted to the first electronic device via WIFI or blue teeth.

Step 330 is to send to the first interaction unit, via the second interaction unit, the procedure of establishing the connection for displaying via a first display unit.

Furthermore, in other embodiments of the invention, when the second interaction unit is in a working state, a movement trail for disposing the second electronic device on the second interaction unit may be received via the second interaction unit. The position where the second electronic device is disposed on the second interaction device may be obtained based on the movement trail of the second electronic device.

By the technical solution provided in the disclosure, the second electronic device may be disposed on the second interaction unit of the first electronic device, and the information of the position of the second electronic device is received when the second interaction unit is in a working state, and then the position where the second electronic device is disposed on the second interaction unit may be obtained based on the information of the position. Once the second electronic device is disposed at a predetermined position on the second interaction unit, a wireless connection with the second electronic device is established and a wireless channel is formed. The transmission of files, especially large files, may be faster via the wireless channel.

Figure 5:
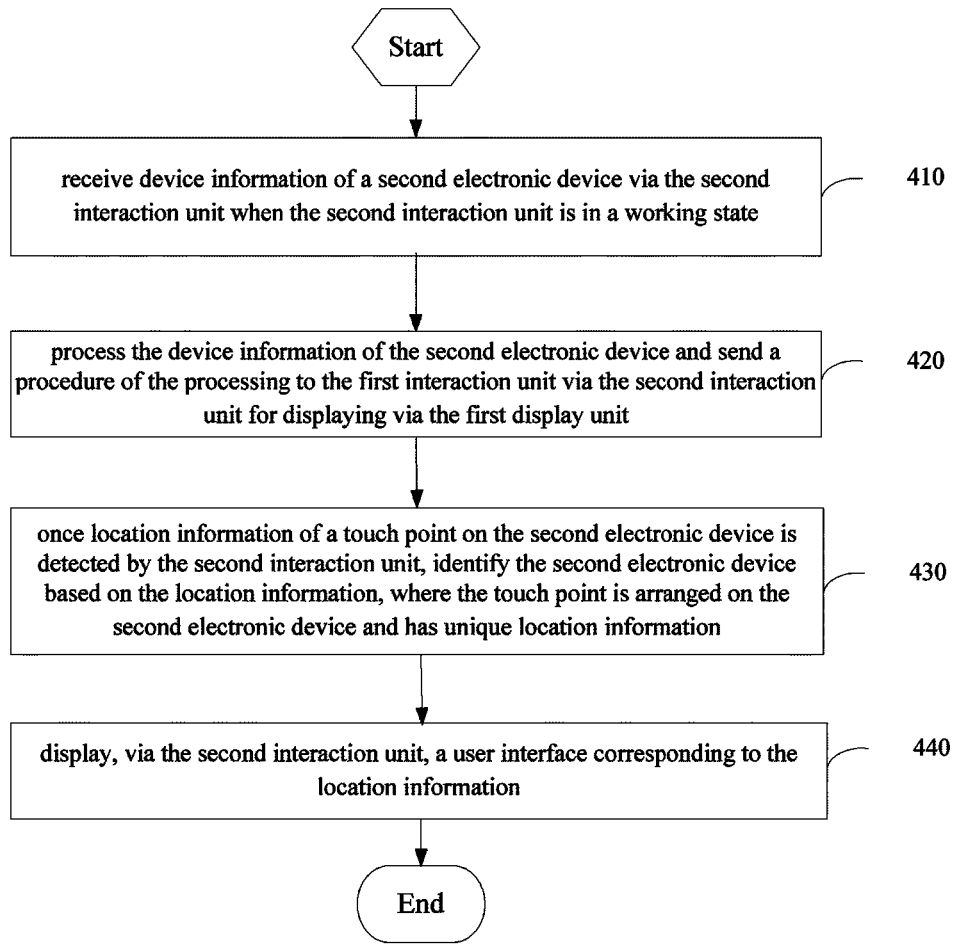
FIG. 5 is another flowchart showing an information interaction method provided according to an embodiment of the invention.

FIG. 5 is another flowchart showing an information interaction method provided according to an embodiment of the invention. The method is applicable in a first electronic device, and includes the steps from Step 410 to Step 440.

Step 410 is to receive device information of a second electronic device via the second interaction unit when the second interaction unit is in a working state.

A first interaction unit and the second interaction unit may each be a touch screen. The first electronic device may be a laptop with a first touch screen and a second touch screen, where the second touch screen is arranged horizontally; the first and the second touch screens are connected; the first and the second touch screens may be folded together and unfolded apart; the first touch screen carries a first display unit, where the first touch screen is configured for displaying output of the laptop; the second touch screen may display input icons such as keys as in the keyboard. Preferably, the second electronic device may be a cell phone or a PAD or a mobile device which is smaller than the second touch screen, thus the cell phone may neither block input operation toward the second touch screen nor block display of output on the second touch screen when the cell phone is disposed on the second touch screen of the laptop. The information of the position where the cell phone is disposed on the second touch screen may be received via the second touch screen when the second touch screen is in a working state.

Step 420 is to process the device information of the second electronic device and send a procedure of the processing to the first interaction unit via the second interaction unit for displaying via the first display unit.

Step 430 is to, once location information of a touch point on the second electronic device is detected by the second interaction unit, identify the second electronic device based on the location information, where the touch point is arranged on the second electronic device and has unique location information.

Step 440 is to display, via the second interaction unit, a user interface (UI) corresponding to the location information.

The touch point is arranged on the second electronic device, and a position where the second electronic device is disposed on the second interaction unit may be obtained based on the detected touch point of the second electronic device. Furthermore, the touch point touches the second interaction unit, and the second interaction unit obtains information of the touch point via the touch point, where the information of the touch point may be a signal with a specific frequency. By setting the signal with the specific frequency, the touch point may be made to have unique location information, such that each second electronic device may have a unique device identifier. Alternatively, multiple touch points may be arranged, and each second electronic device may be made to have a unique identifier based on a distribution of the touch points and dimensions of the touch points. Once the unique device identifier of the second electronic device is detected by the second interaction unit based on the touch point(s), a corresponding UI may be displayed on the second interaction unit based on the device identifier. As shown in FIG. 3, the corresponding UI may be displayed in a second area of a second interaction area, and the UI may be an operation interface for the second electronic device to transmit files or operation interface for other keyboard operations.

Figure 6:
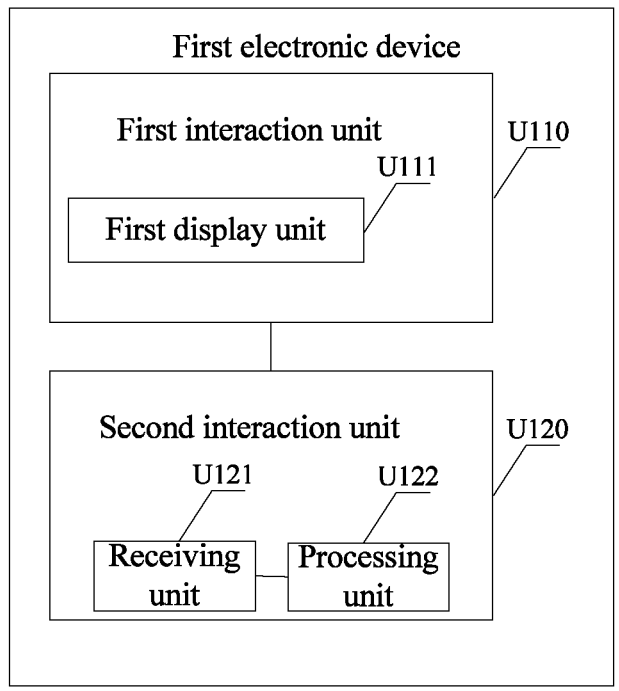
FIG. 6 is schematic structure diagram of an electronic device provided according to an embodiment of the invention.

FIG. 6 is an electronic device provided according to an embodiment of the invention, where the device is a first electronic device. The first electronic device has a first interaction unit U110, a second interaction unit U120, where the first interaction unit U110 includes a first display unit U111. The first electronic device further includes:

a receiving unit U121, configured to receive device information of a second electronic device via the second interaction unit U120 when the second interaction unit U120 is in a working state;

a processing unit U122, configured to process the device information of the second electronic device and send a procedure of the processing to the first interaction unit U110 via the second interaction unit U120 for displaying via the first display unit U111.

Figure 7:
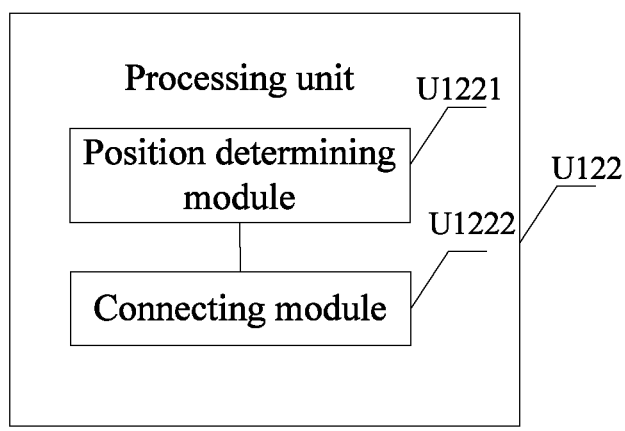
FIG. 7 is schematic structure diagram of an processing unit in an electronic device provided according to an embodiment of the invention.

As shown in FIG. 7, the device information of the second electronic device includes information of a position where the second electronic device is disposed on the second interaction unit, the processing unit U122 includes:

a position determining module U1221, configured to obtain, based on the information of the position, the position where the second electronic device is disposed on the second interaction unit;

a connecting module U1222, configured to establish a connection with the second electronic device once the second electronic device is disposed at a predetermined position on the second interaction unit.

Furthermore, in other embodiments of the invention, the connecting module includes:

a wireless connection sub-module, configured to establish a wireless connection with the second electronic device to form a wireless channel;

a transmitting sub-module, configured to receive, via the wireless channel, data information transmitted by the second electronic device.

Figure 8:
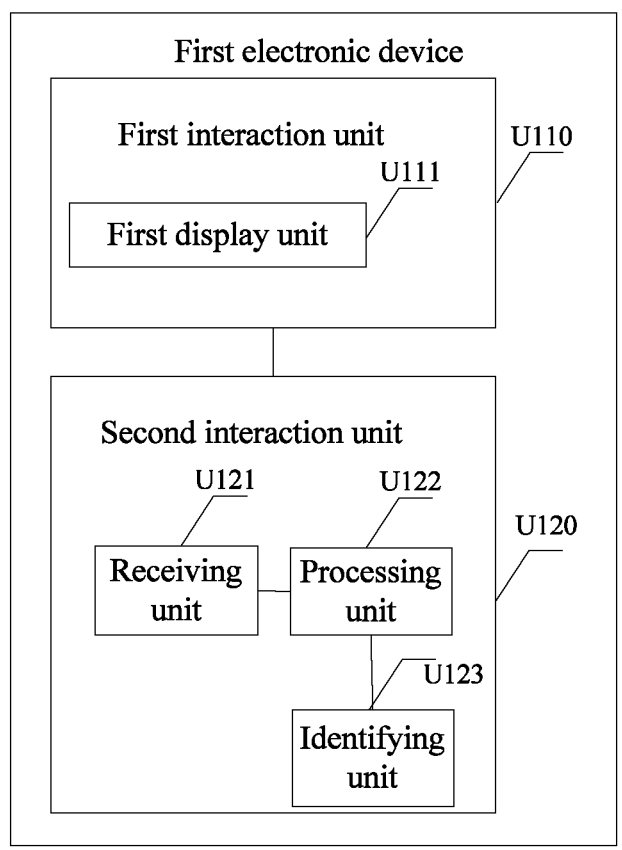
FIG. 8 is another schematic structure diagram of an electronic device provided according to an embodiment of the invention.

As shown in FIG. 8, the first electronic device further includes:

an identifying unit U123, configured to, once location information of a touch point on the second electronic device is detected by the second interaction unit, identify the second electronic device based on the location information, where the touch point is arranged on the second electronic device and has unique location information.

Figure 9:
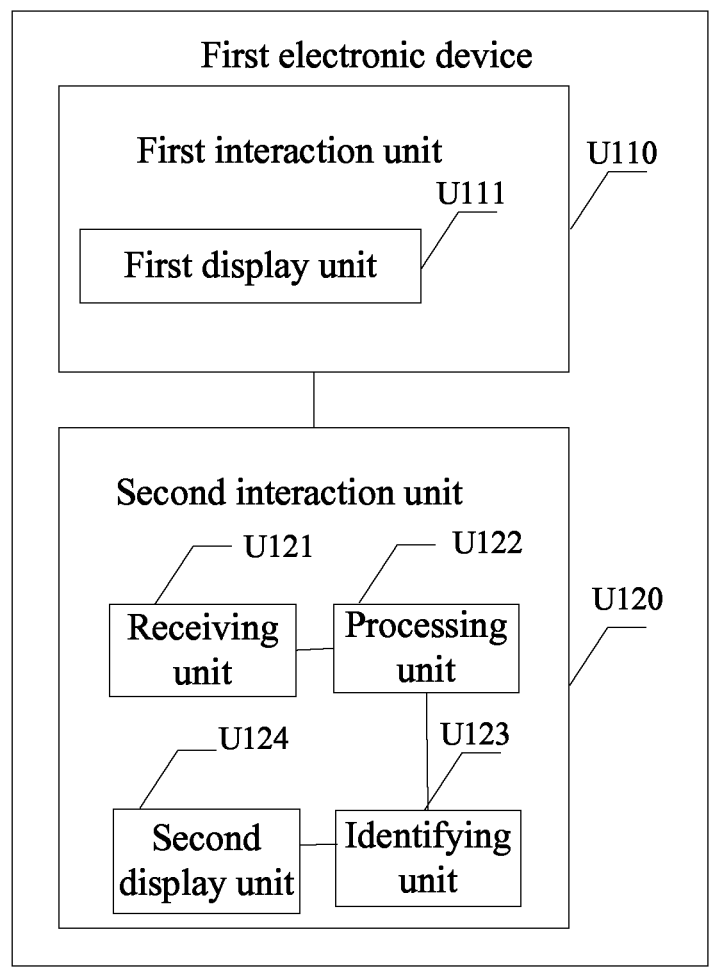
FIG. 9 is another schematic structure diagram of an electronic device provided according to an embodiment of the invention.

As shown in FIG. 9, the first electronic device further includes:

a second display unit, configured to display, via the second interaction unit, a UI corresponding to the location information.

The technical solutions in the disclosure are advantageous as follows.

Compared with the conventional technology, by the technical solutions provided in the disclosure, the second interaction unit, when in a working state, receives device information of the second electronic device, and the connection with the second electronic device may be achieved without inputting information manually, therefore the connection process is simple.

The embodiments of the disclosure are described in a progressive way, and each embodiment emphasizes the differences from other embodiments, and the same or similar contents of the embodiments may be referred to each other. Since the system disclosed by the embodiments corresponds to the method disclosed by the embodiments, the description of the system is brief, and for relevant matters references may be made to the description of the method.

It should be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

For the convenience of description, the device is described as units with various functions. Of course, the functions of the units may be realized via a same or multiple software and/or hardware.

With the above descriptions of the disclosed embodiments, the skilled in the art may practice or use the disclosure. Various modifications to the embodiments are apparent for the skilled in the art. The general principle suggested herein can be implemented in other embodiments without departing from the spirit or scope of the disclosure. Therefore, the disclosure should not be limited to the embodiments disclosed herein, but has the widest scope that is conformity with the principle and the novel features disclosed herein.

The invention claimed is:

1. An information interaction method, applicable in a first electronic device, wherein the first electronic device comprises a first interaction unit and a second interaction unit, and wherein the first interaction unit comprises a first display unit, the method comprising:

receiving device information of a second electronic device via the second interaction unit when the second interaction unit is in a working state, wherein the device information of the second electronic device comprises information of a position where the second electronic device is in direct contact with an upper surface of the second interaction unit, and wherein the second interaction unit detects the information of the position via the upper surface of the second interaction unit;

processing the device information of the second electronic device;

sending a procedure of the processing to the first interaction unit for displaying via the first display unit, wherein the second interaction unit is a touch screen distinct from the first interaction unit; and once location information of a touch point on the second electronic device is detected by the second interaction unit, identifying the second electronic device based on the location information, wherein the touch point is on the second electronic device, and wherein the location information is unique to the touch point, wherein
the second electronic device is located in a first area on the second interaction unit,
a user interface is displayed in a second area of the second interaction unit, and
the second area is different from the first area.

2. The method according to claim 1, wherein processing of the device information of the second electronic device comprises:
obtaining, based on the information of the position, the position where the second electronic device is in direct contact with the upper surface of the second interaction unit; and
establishing a connection with the second electronic device once the second electronic device is in direct contact with the upper surface of the second interaction unit at a predetermined position.

3. The method according to claim 2, wherein the establishing of the connection with the second electronic device comprises:
establishing a wireless connection with the second electronic device to form a wireless channel; and
receiving, via the wireless channel, data information transmitted by the second electronic device.

4. The method according to claim 1, further comprising displaying, by the second interaction unit, an user interface corresponding to the location information.

5. A first electronic device comprising:
a first interaction unit comprising a first display unit;
a second interaction unit which is a touch screen distinct from the first interaction unit; and
a processor and a memory storing program codes, wherein the processor executes the stored program codes to
receive device information of a second electronic device via the second interaction unit when the second interaction unit is in a working state, wherein the device information of the second electronic device comprises information of a position where the second electronic device is in direct contact with an upper surface of the second interaction unit, and wherein the second interaction unit detects the information of the position via the upper surface of the second interaction unit, and
process the device information of the second electronic device and send a procedure of the processing to the first interaction unit for displaying via the first display unit,
wherein
the processor further executes the stored program codes to, once location information of a touch point on the second electronic device is detected by the second interaction unit, identify the second electronic device based on the location information,
the touch point is on the second electronic device,
the location information is unique to the touch point,
the second electronic device is located in a first area on the second interaction unit,
a user interface is displayed in a second area of the second interaction unit, and
the second area is different from the first area.

6. The electronic device according to claim 5, wherein the processor further executes the stored program codes to:
obtain, based on the information of the position, the position where the second electronic device is in direct contact with the upper surface of the second interaction unit; and
establish a connection with the second electronic device once the second electronic device is in direct contact with the upper surface of the second interaction unit at a predetermined position.

7. The electronic device according to claim 6, wherein the processor further executes the stored program codes to:
establish a wireless connection with the second electronic device to form a wireless channel; and
receive, via the wireless channel, data information transmitted by the second electronic device.

8. The electronic device according to claim 5, further comprising a second display unit configured to be used by the second interaction unit to display a user interface corresponding to the location information.

9. The method according to claim 1, wherein the position where the second electronic device is in direct contact with the upper surface of the second interaction unit is obtained via a detected touch point on the second electronic device or is determined based on a movement trail of the second electronic device.

10. The method according to claim 1, further comprising:
establishing a wireless connection between the first electronic device and the second electronic device;
establishing a web site service whereby to receive data at a web site and store the data according to a corresponding path;
accessing via the second electronic device a page of the web site via a wireless local area network; and
calling via the second electronic device an uploading function of the web site and then transmitting files of the second electronic device to the first electronic device.

11. The method according to claim 1, further comprising:
establishing a WiFi® connection or a Bluetooth® connection with the second electronic device; and
transmitting files of the second electronic device to the first electronic device via the WiFi® connection or the Bluetooth® connection.

12. The method according to claim 1, wherein the user interface is an operation interface for (i) the second electronic device to transmit files, or (ii) keyboard operations.

13. The first electronic device according to claim 5, wherein the position where the second electronic device is in direct contact with the upper surface of the second interaction unit is obtained via a detected touch point on the second electronic device or based on a movement trail of the second electronic device.

14. The first electronic device according to claim 5, wherein the user interface is an operation interface for (i) the second electronic device to transmit files, or (ii) keyboard operations.

15. The first electronic device according to claim 5, wherein the second interaction unit is configured to (i) establish a WiFi® connection or a Bluetooth® connection with the second electronic device, and (ii) receive files from the second electronic device via the WiFi® connection or the Bluetooth® connection.

16. The first electronic device according to claim 5, wherein the processor further executes the stored program codes to:
establish a wireless connection with the second electronic device; and
establish a web site service to receive data at a web site and store the data according to a corresponding path,
wherein the second electronic device is configured to access a page of the web site via a wireless local area network, and call an uploading function of the web site and then transmit files of the second electronic device to the first electronic device.

17. The method of claim 1, wherein the touch screen is being used to detect the position of the second electronic device on top of the touch screen.

18. The first electronic device of claim 5, wherein the touch screen is being used to detect the position of the second electronic device on top of the touch screen.

* * * * *